2,474,006

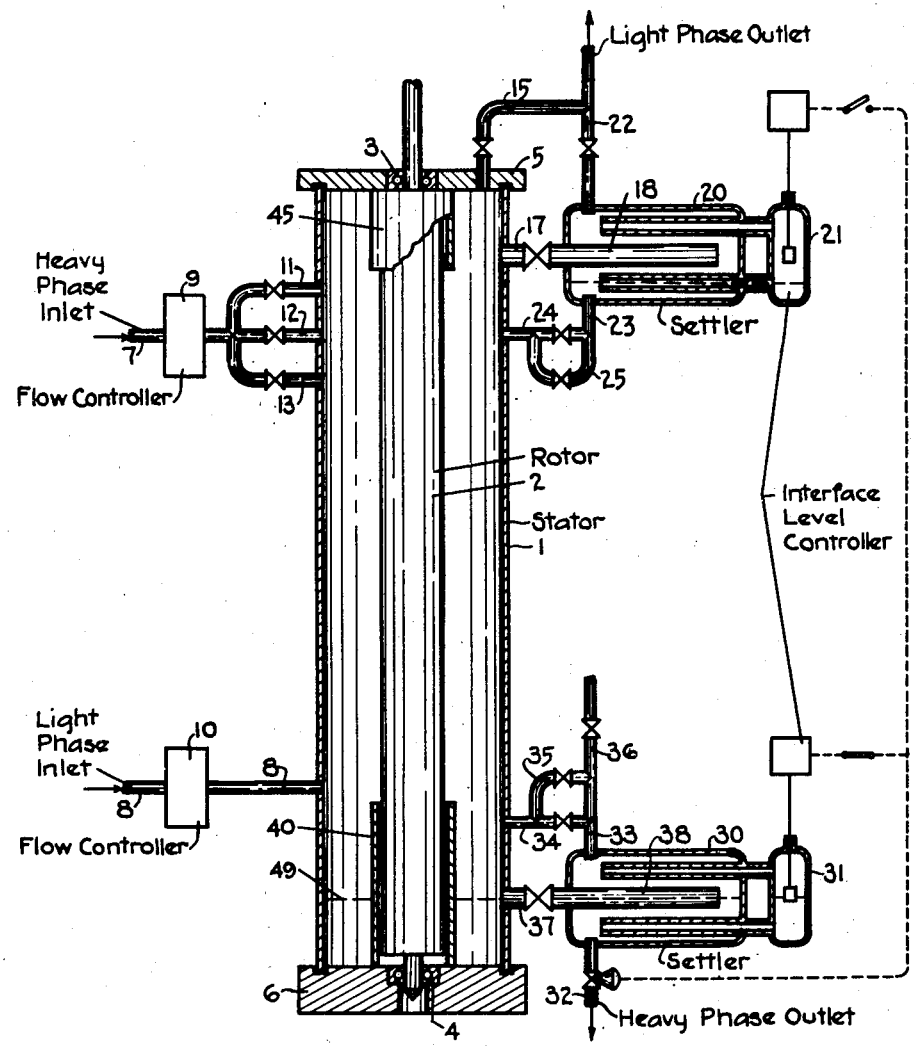
Fig. I

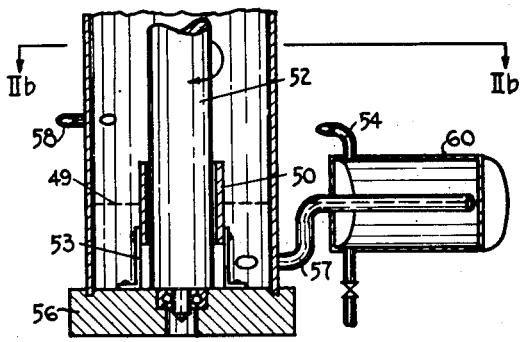
Fig. IIa
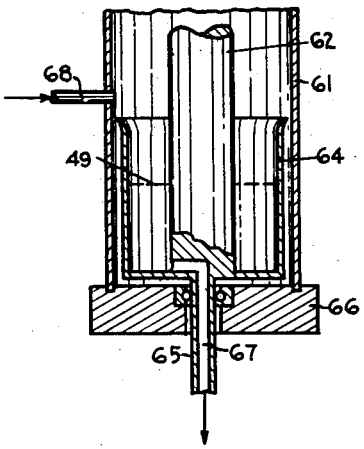
Fig. III
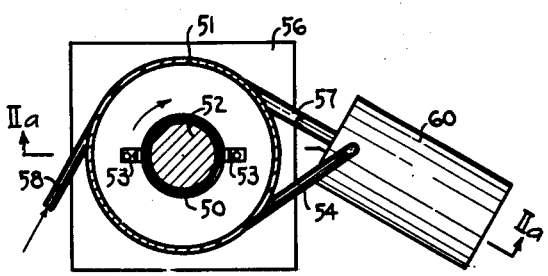
Fig. IIb
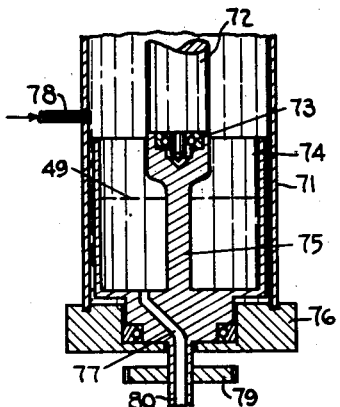
Fig. IV
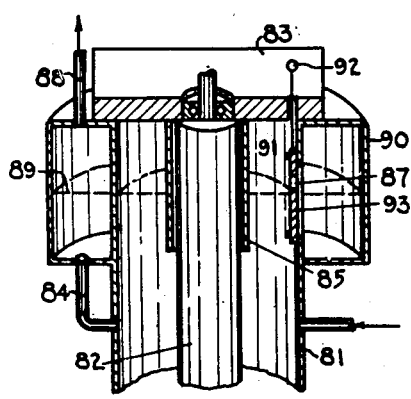
Fig. V
Inventor: Russel L. Maycock
By his Attorney: Hugh A. Kirk June 21, 1949.  R. L. MAYCOCK  2,474,006
ROTARY CONTACTOR FOR FLUIDS
Filed April 11, 1949  3 Sheets-Sheet 3
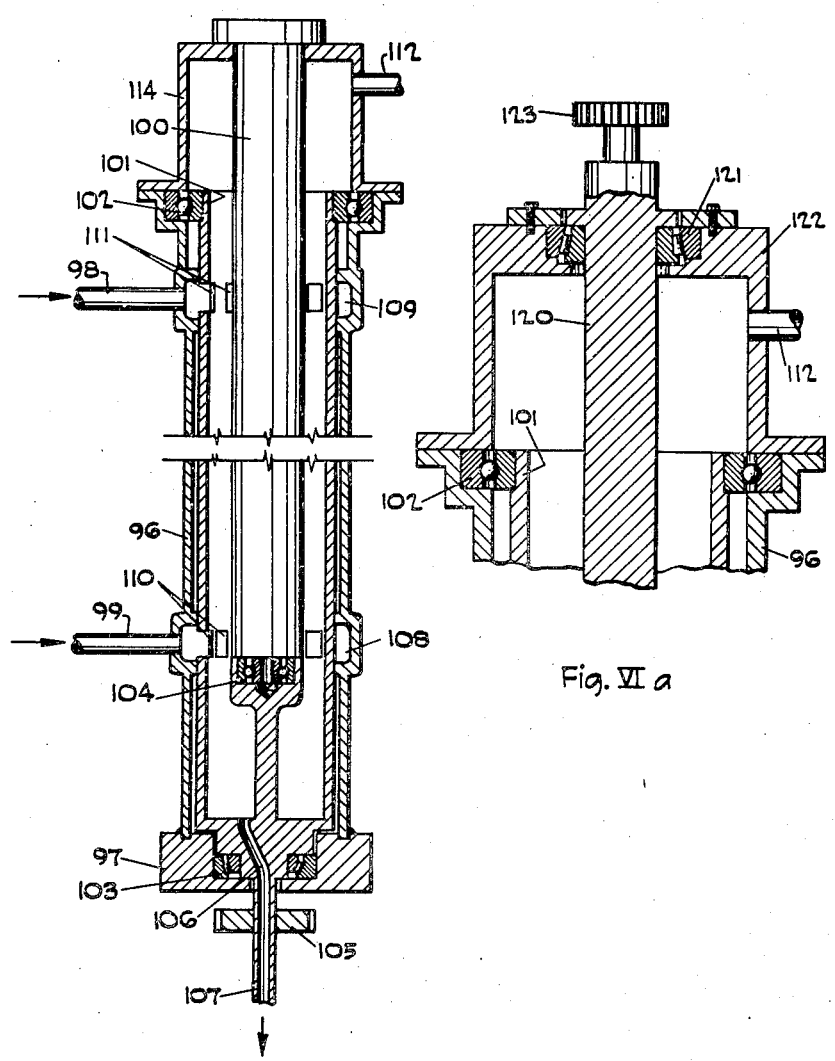
Fig. VI
Fig. VI a
Inventor:
 Russel L. Maycock
By Oswald H. Milmore
 his Attorney Patented June 21, 1949

UNITED STATES PATENT OFFICE 2,474,006

ROTARY CONTACTOR FOR FLUIDS

Russel L. Maycock, Oakland, Calif., assignor to Shell Development Company, San Francisco, Calif., a corporation of Delaware Application April 11, 1949, Serial No. 86,841

15 Claims. (Cl. 261—83)

This invention relates to rotary contacting apparatus wherein fluids are contacted by flow between relatively rotating walls which impose shear on the fluids and disperse one fluid within the other. More particularly, the novel features of the invention relate to an improved arrangement for separating the fluid phases which are formed in such rotary contactor apparatus, such as the provision of shielding means at the interface level between the two phases in the contact zone of the apparatus.

By "fluid" is meant liquid, gas, vapor, and powdered and finely divided bodies which are capable of forming a multi-phase system, or, more specifically, a dispersion of at least one type of material in a continuous phase of another. The two or more fluid substances which are contacted may include a fluid and a fluid-contacting agent. Fluid contacting agents include acid-reacting substances, basic reacting substances, salts, reducing agents, oxidizing agents, halogenating agents, solutizing agents, neutral or reactive absorbents, adsorbents such as clay, charcoal, gels, cation and anion exchange resins, and other agents commonly employed in processes for reacting, treating, refining, separating, extracting, purifying, concentrating, etc. fluids and fluid mixtures. Each phase may comprise two or more substances.

The rotary contactor apparatus comprises an annular contact zone formed between a housing and a core, the core being within the housing but out of contact therewith. The inner surface of the housing and the outer surface of the core are surfaces of revolution, and at least one of said surfaces rotates about its axis of revolution relative to that of the other surface. One form of such a contactor comprises two concentric cylinders wherein the inner cylinder is rotated and the outer cylinder is stationary (see Figure I).

Normally in the rotary contacting apparatus, one of the two phases is dispersed in the other- and-continuous phase by the shearing forces developed in the fluids in the contact zone by the relative rotation of one surface to that of the other surface of the zone. The speed of the relative counter-rotation of the surfaces should, for most efficient operation, be sufficient to cause an orderly distribution of the dispersed phase in the continuous phase, but insufficient to cause random turbulence. The two phases to be contacted may be passed either concurrently or countercurrently through the annular contact zone.

It is a purpose of this invention to easily, economically, simply and efficiently separate two phases which have been contacted in a rotary contactor. Another purpose is to reduce the formation of emulsions and/or foams at the interface level in a rotary contactor. Another purpose is to expedite the separation of the two fluid phases which have been contacted in the rotary contactor. Still another purpose is to provide simple means for carrying out the above purposes.

Briefly, according to the invention a stilling space is provided at one or both ends of the annular contact zone of a contactor having as elements thereof a housing and a core, wherein the fluid phases are not subjected to the intense shear that prevails in the contact section, i. e., wherein the phases are subjected to a lesser shear or, preferably, to no shear. This reduction in the shearing stresses is achieved by providing radially spaced walls for the stilling space which preferably have radii substantially equal to the radii of the housing and core of the contact zone, whereby the stilling space is annular in form and forms an extension of the contact zone, and by mounting at least one of the walls of the stilling space to permit relative rotation between itself and the contactor element of substantially equal radius. By this construction the walls of the stilling space may be held stationary one with respect to the other (although both may be rotating or stationary) or may be rotated one with respect to the other at a lesser relative speed than the relative speed of the core and housing.

According to a preferred embodiment the stilling space is formed by providing a shielding means, such as a sleeve, located at the interface level between the two phases at one end of the annular space between the housing and core, this shielding means forming one wall of the stilling space. By this arrangement the shear in the fluid mixture between the counter-rotating surfaces is reduced. This sleeve may be stationary or may be rotated.

Figure I is a vertical partial section of one embodiment of a rotary contactor apparatus provided with one embodiment of the shielding means of this invention. Figure IIa is a partial section of the lower end of a rotary contactor apparatus disclosing a modification of this invention. Figure IIb is a horizontal section taken along the line IIb—IIb of Figure IIa. Figures III, IV and V are partial sections of further modifications of this invention. Figure VI is a partial section of a modified form wherein the outer shell is rotated. Figure VIa is a fragmentary view of a part of the device according to Fig. VI showing a modification.

For the purpose of illustration, the rotary contactor in Figure I will now be described when operating as a liquid-liquid solvent extractor wherein a liquid mixture to be separated is the lighter and continuous phase and flows through the annular cylindrical zone countercurrently to a solvent which is the heavier and dispersed phase. The rotary contactor comprises, in this case, a stationary housing 1 having an inner cylindrical surface, and a rotating core 2, having an outer cylindrical surface. The housing and core are, in the embodiment illustrated, usually designated as the stator and rotor, respectively. The rotor is mounted at each end in bearings 3 and 4 in end plates 5 and 6 and rotated by a suitable power means not shown. Near the upper end of the apparatus is provided a heavy phase inlet line 7 and near the bottom of the apparatus is a light phase inlet line 8. Both inlet lines 7 and 8 contain flow controllers 9 and 10 respectively. Either or both inlet lines from the flow controller may enter a manifold from which the respective phase may be introduced into the contact zone at any one or more of several different levels, such as shown by valved lines 11, 12 and 13 connecting with the heavy phase inlet line 7.

Above the heavy phase inlet port 11 is provided one or more outlet lines such as 17 or 15. Line 17 with extension 18 passes into a settler 20 provided with positive level control means 21. Connected at the top of settler 20 is a light phase outlet line 22 which may join with line 15 coming directly from the top of the contact zone through top plate 5. From the bottom of settler 20 is recycle line 23 which may be returned directly to the contact zone through valved line 24 or connect through the gooseneck 25 to provide a liquid seal between the fluid in the contact zone and that in the settler 20.

Below the light phase inlet line 8 is withdrawal line 37 with extension 38 which passes into settler 30 provided with a positive level control means 31. From the top of settler 30 are shown recycle lines 33, 34 and 35, corresponding respectively to lines 23, 24 and 25 of settler 20, as well as a valved vent line 36 to prevent vapor lock in the recycle lines. From the bottom of settler 30 is provided valved heavy phase outlet line 32. The valve in this line is controlled by either level control means 21 or 31 to maintain the interface level constant in the settler in which it occurs.

Around the bottom of the rotor 2 is provided a stationary sleeve shield 40 mounted in base plate 6. This shield extends to a level above that of the recycle line 34 and below that of inlet line 8. A similar shield may also be provided at the upper end of the column, such as sleeve shield 45 stationarily mounted in top plate 5 and extending down below the withdrawal ports 15 and 17, but above the upper inlet port 11. These sleeve shields have outer radii which are only slightly greater than the radius of the core or rotor 2, and form the inner walls of the stilling spaces, the outer walls of which are formed by the housing or stator 2.

In the operation of the apparatus shown in Figure I, the light phase is introduced through line 8 and passes up through the annular zone between the stator 1 and rotor 2 and is withdrawn through lines 17 and 22. If there is any carryover of the dispersed heavy phase with the light continuous phase through line 17, this carryover is allowed to coalesce in settler 20 and return to the contact zone through the recycle line 24 or 25, as desired.

On the other hand, if there is little or no carryover of the heavy phase with the continuous phase from the top of the column, the settler 20 may be eliminated and the stilling space between the sleeve 45 and stator 1 may provide sufficient settling means so that the light phase may be withdrawn directly through line 15 in top plate 5. Sleeve shield 45 is merely shown as an alternative to the use of the upper settler 20, although both may be employed, if desired.

The heavy phase is introduced through line 7 and one or more of its branches 11, 12 or 13 into the contact zone, wherein the shearing action of the light continuous phase caused by the rotation of the rotor 2 disperses the heavy phase into small droplets which become distributed in an orderly fashion in the continuous phase in the zone and pass around and downwardly through the zone where they coalesce to form an interfacial layer 49 at or near the outlet line 37. The dispersed phase always travels towards the interface level. The shield 40 prevents the rotor from setting up shearing forces in the continuous phase below the upper end of said shield and therefore the shielded region formed between the shield 40 and the stator 1 at the bottom of the column provides a quiescent region and, in effect, acts as a preliminary settler for the separation of the two phases. Extensions 18 and 38 also reduce the shearing forces in the fluid withdrawn from the contact zone and aid in shielding the separation of the phases from the action of the rotor 2. The interface level is maintained constant during the continuous operation of the contactor by the action of the positive level control means 31 operating the valve in line 32 through which the heavy phase product is withdrawn.

If the heavy phase were the continuous phase, the interface level would be at the upper end of the contactor, and shield 45 would then function to reduce the shear at the interface level.

If the shield 40 did not extend beyond either side of the interface level, the action of the rotor might easily cause emulsification or foaming of the two phases which would materially hinder their speedy separation.

The centrifugal force of the fluid mixture in the column, due to the rotation of the rotor, may force some of the fluid mixture through the recycle line 34. This may be prevented by extending the shield above the level of the port of line 34. But this is not necessary and is not desirable if there is sufficient difference in the hydrostatic head between the light phase being recycled from the top of settler 30 and the mixture of both phases in the annular contact zone between lines 34 and 37.

Figures IIa and IIb disclose two views of a modification of a shielding means and settler arrangement for the bottom of a contactor similar to that shown in Figure I. This modification takes advantage of the kinetic energy of the rotating fluid mixture in the column. In Figure IIa, shield 50 is shown to be around the rotor 52 and extending only a short distance above and below the interface level 49 so as to be below the inlet and recycle ports of lines 58 and 54, respectively, and above the outlet port of line 57. The sleeve 50 is stationarily mounted by brackets 53 fastened to the base plate 56. The outlet line 57 is tangentially attached to the side of the stator 51 so that when the rotor is rotated in the direction shown by the arrows, the energy of rotation of the fluid will push the fluid out and up through line 57 into the settler 60. The recycle line 54 from the top of the settler 60 is tangentially attached to the stator 51 on the opposite side from the locus of attachment of line 57 so that the rotation of the fluid will draw the lighter phase from the top of the settler into the contact zone.

It may be desirable also to position the feed line 58 tangentially to the stator 51 so that the feed may be introduced with minimum turbulence into the contact zone.

Figure III discloses a different type of means for shielding the interface level so as to aid in separation of the phases in a rotary contactor, namely forming a sleeve adjacent to the stator which rotates with and at the same speed as the rotor. In Figure III, stator 61 is mounted on base plate 66. Rotor 62 is provided with outwardly and upwardly extending cup-shaped sleeve 64 which extends from the bottom of the column to a point below the feed inlet 68. In the annular region between the sleeve 64 and rotor 62, the fluid in the column is free from any shearing forces, so that separation of the two phases may readily occur. The heavier phase is withdrawn from the bottom of the cup through passageway 67 connected with the duct in hollow rotor shaft 65.

Figure IV shows a still further modification of a shielding means and is similar to that shown in Figure III except that the cup is detached from the rotor. This cup may be stationary or may be rotated, such as at about half the angular velocity of the rotor. This is about the velocity of the rotation of the fluid mixture in the annular contact zone between the rotor 72 and the stator 71. The end of the rotor 72 is mounted in bearing 73 on post 75 extending axially from the bottom of the cup-shaped shield means 74. Cup 74 is journaled in base plate 76 which supports the stator 71 and is rotated by gear 79 on shaft 80 separately from rotor 72. The outlet port from the bottom of cup 74 is connected with the duct in hollow shaft 80 through passageway 77. The upper edge of cup 74 is located below the inlet port of inlet line 78.

Figure V shows still another modification of this invention wherein the settler 90 surrounds the stator 81 opposite the shielding means 85 at the interface level 89. The shielding means 85 surrounds the rotor 82 journaled in top plate 83. The withdrawal port 87 between the annular zone and the settler 90 may be provided in a slide 91 operated by a suitable means 92 along the slot 93 in the stator 81, so that withdrawal of the fluid from the column may be made either at, above, or below the interface level 89 as desired. Adjustable port 87 permits ready compensation for changes in location of the interface level 89. The recycle line 84 and the light phase outlet line 88 from settler 90 are preferably provided on the opposite side of the settler 90 from the port 87. An advantage of this type of settler surrounding the stator permits a minimum amount of change of temperature of the fluids during the separation of these fluids in the settler outside of the contactor. Furthermore, a lesser amount of lagging is required for this type of settler than for one entirely separated from the contactor. Still further, this type of construction provides for structural simplicity in isothermal systems.

The column may be constructed to make the core stationary and the housing rotating, for example, as shown in Figure VI wherein 96 is a stationary casing mounted on a fixed base 97 and provided with inlets 98 and 99, through which the heavier and lighter fluids, respectively, may be introduced into the apparatus when it is used for countercurrent treatments. A stationary cylindrical core 100 depends from the top 114 of the casing. A rotating housing 101 surrounds the core 100 and is provided with bearings 102 and 103, which maintain the housing in its position. Bearing 104 at the top of a post extending axially from the bottom of the rotating housing 101 maintains the core 100 in alignment. The housing may be rotated by gear 105 on shaft 107. The lower outlet is connected to the interior of the housing by a duct 106. Fluids introduced via conduits 99 and 98 enter annular spaces formed at 108 and 109, respectively, and enter the housing 101 through ports 110 and 111. The walls of the casing 96 are close to the housing 101 near the annular spaces to minimize escape of fluids but need not be in contact. The light phase is discharged through the pipe 112. It will be noted that there is a stilling space both at the top and at the bottom of the column: At the bottom this space is the portion below the core 100, wherein both the housing and the central post rotate, as in Fig. IV; at the top, the stilling space is above the top of the housing 101, wherein both the core 100 and the casing top 114 are stationary.

Many modifications of the rotory contactor apparatus are possible without departing from the scope of this invention. For example, the surface of the contact zone may be stepped, curved or tapered, and either one or both of the surfaces may be rotated in the same or opposite direction, provided there is a sufficient relative angular velocity between these surfaces to maintain the dispersed phase distributed in an orderly fashion in the continuous phase. Thus, the core of the apparatus according to Figure VI may be modified for rotation with respect to the casing top. Such a modification is shown in Figure VIa, which differs from Figure VI only in that the core 120 is mounted in a bearing 121 fitted in the casing top 122, and is provided with a gear 123 by which it may be driven from any source of power (not shown) in a direction opposite to or the same as but at a speed different from that at which the housing 101 is driven, so as to provide relative rotation between the core and housing. In this embodiment the two walls of the stilling space, i. e., the core 120 and cylindrical walls of the casing top 122, have some relative motion, and it is necessary in order to realize the advantages of the invention that this relative motion be less than the relative motion between the housing 101 and core 120. This requirement is satisfied whenever the core and housing are rotated in opposite directions, and may be met also when they rotate in the same direction by rotating the core at a lesser speed than the housing.

The apparatus may be operated under atmospheric or at lower or higher pressures. Other inlet or outlet lines may be placed at different points along the rotary contact zone for removal of part of the fluid mixture as it passes through the contact zone. The apparatus may be jacketed to control and maintain any desired temperature. If the rotor is relatively long in comparison to its diameter, it may be steadied by a bearing between its ends. The outside settlers and the cups (64 or 74) may contain baffles.

The apparatus, including the shielding means, may be constructed of any suitable material which will stand the strain of the rotational and other forces present during their operation, and not react with the heterogeneous fluids being contacted therein. Some suitable materials are various steels including stainless steel, nickel, brass, Monel metal, aluminum, magnesium, glass, earthenware, plastic, wood, etc., depending upon the nature of the fluids contacted and the temperatures and pressures employed.

This application is a continuation-in-part of application Serial Number 600,797, filed June 21, 1945.

The invention claimed is:

1. In combination, a rotary contactor comprising as elements thereof a housing and a core within said housing, said housing and core being spaced apart to provide an elongated annular contact zone between the inner surface of the housing and the outer surface of the core and being rotatable one with respect to the other, said contactor structure being adapted to disperse one fluid within another by imposing shearing stress on fluids between said surfaces, and a pair of radially spaced walls at one end of the contact zone having opposing surfaces with radii substantially equal to the radii of said housing and core, respectively, at least one of said walls being mounted to permit relative rotation between itself and the contactor element of substantially equal radius, providing an annular stilling space between said walls.

2. In combination with a rotary contactor comprising a housing and a core within said housing, said housing and core being spaced apart to provide an elongated annular contact zone between the inner surface of the housing and the outer surface of the core and being rotatable one with respect to the other, said contactor being adapted to disperse one fluid within another by imposing shearing stress on fluids between said surfaces, a shield within the contact zone, mounted to permit relative rotation between the shield and one of said surfaces and spaced from the other of said surfaces, providing a stilling space between the shield and said other surface.

3. The combination of parts according to claim 2, in which the housing is stationary and the core is rotatable, and the shield is fixed with respect to the housing, the stilling space being between the shield and the surface of the housing.

4. The combination according to claim 2, in which the housing is stationary and the core is rotatable, and the shield is fixed with respect to the core, the stilling space being between the shield and the surface of the core.

5. The combination according to claim 2, in which the shield is rotatable with respect to both the housing and the core.

6. In combination with a rotary contactor comprising a housing, a core within said housing, said housing and core being spaced apart to provide an elongated annular contact zone between the inner surface of the housing and the outer surface of the core and being rotatable one with respect to the other and inlet means for the introduction of fluids into the contact zone, said contactor being adapted to disperse one fluid within another by imposing shearing stress on fluids between said surfaces, a shield near at least one end of and within the contact zone, mounted to permit relative rotation between the shield and one of said surfaces and spaced from the other of said surfaces, providing a stilling space between the shield and said other surface, said shield being displaced axially from said inlet means.

7. The combination according to claim 6, having outlet means for the discharge of fluid from the contact zone, the outlet means being located to require fluids discharged therethrough to flow through the stilling space.

8. In combination with a rotary contactor comprising a stationary cylindrical housing, a cylindrical core within said housing rotatable about the axis of the cylinder, said housing and core being spaced apart to provide an elongated annular contact zone between the inner surface of the housing and the outer surface of the core, and inlet means for the introduction of fluids into the contact zone, said contactor being adapted to disperse one fluid within another by imposing shearing stress on fluids between said surfaces, an annular cylindrical shield near at least one end of and within the contact zone located adjacent to the core and axially offset from said inlet means and spaced apart from the housing, said shield being fixed with respect to the housing to provide a stilling space between the shield and the housing.

9. In combination with a rotary contactor comprising a housing and a rotatable core within said housing, said housing and core being spaced apart to provide an elongated annular contact zone between the inner surface of the housing and the outer surface of the core, said contactor being adapted to disperse one fluid in another by imposing shearing stress on fluid in said contact zone, a cup in at least one end of the contact zone, rotatable with respect to the housing, the outer edge of the cup being adjacent the surface of the housing, providing a stilling space within the cup, and means for withdrawing fluid directly from said stilling space.

10. The combination according to claim 9, in which the cup is rotatable with respect to both the housing and the core, together with means for rotating said cup at a speed less than the speed of rotation of the core.

11. In combination with a rotary contactor comprising a housing, a rotatable core within said housing, said housing and core being spaced apart to provide an elongated annular contact zone between the inner surface of the housing and the outer surface of the core, and inlet means for the introduction of fluids into the contact zone, said contactor being adapted to disperse one fluid in another by imposing shearing stress on fluid in said contact zone, shielding means in at least one end of said contact zone, mounted to permit relative rotation between the shield and one of said surfaces and spaced from the other of said surfaces, providing a stilling space between the shield and said other surface, and a withdrawal port in said housing disposed substantially tangentially to its inner surface for the discharge of fluid.

12. In combination with a rotary contactor comprising a housing and a core within said housing, said housing and core being spaced apart to provide an elongated annular contact zone between the inner surface of the housing and the outer surface of the core and being rotatable one with respect to the other, said contactor being adapted to disperse one fluid within another by imposing shearing stress on fluids between said surfaces, shielding means in at least one end of said contact zone adapted to form with one of said surfaces a stilling space, a settler external of said contact zone and substantially opposite said stilling space, an outlet connection from said contact zone to said settler, and a recycle connection from said settler to said contact zone.

13. In combination with a rotary contactor comprising a housing, a core within said housing, said housing and core being spaced apart to provide an elongated annular contact zone between the inner surface of the housing and the outer surface of the core and being rotatable one with respect to the other, and inlet means for introducing fluids into said contact zone, said contactor being adapted to disperse one fluid within another by imposing shearing stress on fluids between said surfaces, shielding means in at least one end of said surfaces adapted to form with one of said surfaces a stilling space, a settler external of said contact zone and substantially opposite said stilling space, an outlet connection from said contact zone to said settler, and a recycle connection from said settler to said contact zone, said recycle connection being axially spaced along said contact zone to discharge at a point closer to the inlet means than said outlet connection.

14. In combination with a rotary contactor comprising a housing and a core within said housing, said housing and core being spaced apart to provide an elongated annular contact space between the inner surface of the housing and the outer surface of the core and being rotatable one with respect to the other, said contactor being adapted to disperse one fluid within another by imposing shearing stress on fluids between said surfaces, an annular shield in at least one end of the contact zone mounted to permit relative rotation between the shield and one of said surfaces and spaced from the other of said surfaces, providing a stilling space between the shield and said other surface, an external settler near said shield, and an outlet connection from said contact zone to said settler, located so as to be in flow communication with the central portion of the contact zone only through said stilling space.

15. The settler according to claim 14 in which the settler encloses the housing along a portion of its length.

RUSSEL L. MAYCOCK.

REFERENCES CITED

The following references are of record in the file of this patent:

UNITED STATES PATENTS

| Number | Name | Date |
|---|---|---|
| 306,040 | Windhausen | Sept. 30, 1884 |
| 1,669,638 | Wagner | May 15, 1928 |
| 2,091,645 | McConnell | Aug. 31, 1937 |
| 2,176,899 | Gordon et al. | Oct. 24, 1939 |
| 2,218,342 | Pegram | Oct. 15, 1940 |

OTHER REFERENCES

Publication, article by W. O. Ney and H. L. Lochte, Ind. and Eng. Chemistry, vol. 33, No. 6, pages 825–27.